(12) United States Patent
Gutendorf et al.

(10) Patent No.: US 7,464,980 B2
(45) Date of Patent: Dec. 16, 2008

(54) VEHICLE WITH MOVABLE CONVERTIBLE TOP

(75) Inventors: Peter Gutendorf, Osnabruck (DE); Reiner Hinrichs, Osnabruck (DE); Jorg Jahn, Bünde (DE)

(73) Assignee: Wilhelm Karmann GmbH, Osnabruck (DE)

( * ) Notice: Subject to any disclaimer, the term of this patent is extended or adjusted under 35 U.S.C. 154(b) by 471 days.

(21) Appl. No.: 10/531,825

(22) PCT Filed: Oct. 17, 2003

(86) PCT No.: PCT/DE03/03442

§ 371 (c)(1), (2), (4) Date: Oct. 17, 2005

(87) PCT Pub. No.: WO2004/037580

PCT Pub. Date: May 6, 2004

(65) Prior Publication Data

US 2006/0255618 A1 Nov. 16, 2006

(30) Foreign Application Priority Data

Oct. 18, 2002 (DE) .............................. 102 48 762

(51) Int. Cl.
*B60J 7/00* (2006.01)
(52) U.S. Cl. .................... 296/107.01; 318/466
(58) Field of Classification Search ............ 296/107.01, 296/107.09; 318/466; 324/663
See application file for complete search history.

(56) References Cited

U.S. PATENT DOCUMENTS

| 5,225,747 | A | * | 7/1993 | Helms et al. ................. 318/265 |
|---|---|---|---|---|
| 5,592,777 | A | | 1/1997 | Petri et al. |
| 6,600,284 | B1 | | 7/2003 | Weber et al. |
| 6,812,466 | B2 | * | 11/2004 | O'Connor et al. ......... 250/341.1 |
| 6,863,334 | B2 | * | 3/2005 | Dangl et al. ............ 296/107.09 |
| 7,175,225 | B2 | * | 2/2007 | Hofers et al. ........... 296/107.01 |
| 7,323,885 | B2 | * | 1/2008 | Gutendorf .................... 324/663 |
| 2001/0029416 | A1 | * | 10/2001 | Breed et al. ..................... 701/45 |
| 2002/0121872 | A1 | | 9/2002 | Boisvert et al. |
| 2005/0012484 | A1 | * | 1/2005 | Gifford et al. ................ 318/466 |
| 2006/0006701 | A1 | * | 1/2006 | Wells .......................... 296/223 |
| 2006/0119130 | A1 | * | 6/2006 | Hofers et al. ........... 296/107.01 |
| 2006/0139036 | A1 | * | 6/2006 | Gutendorf .................... 324/686 |
| 2007/0035154 | A1 | * | 2/2007 | Eisenreich et al. ...... 296/107.01 |
| 2007/0183182 | A1 | * | 8/2007 | Pribisic ...................... 365/145 |
| 2007/0193811 | A1 | * | 8/2007 | Breed et al. .................. 180/271 |

(Continued)

FOREIGN PATENT DOCUMENTS

DE 195 39 482 A1 6/1996

(Continued)

*Primary Examiner*—Jason S Morrow
(74) *Attorney, Agent, or Firm*—Gifford, Krass, Sprinkle, Anderson & Citkowski, P.C.

(57) ABSTRACT

A motor vehicle that is equipped with a movable convertible top comprising control equipment for controlling the convertible top motion and a detection device for recognition of an intervention into the range of motion of a convertible top mechanism, which is equipped with a sensor system with sensors operating with different measurement principles, wherein, when recognizing a malfunction of the detection device or when recognizing an obstruction situation, the convertible top motion is controlled in a safety mode during which the convertible top motion continues with reduced speed and power or is stopped or reversed.

27 Claims, 8 Drawing Sheets

U.S. PATENT DOCUMENTS

2008/0066671 A1 * 3/2008 Donahue et al. ............ 114/361

FOREIGN PATENT DOCUMENTS

| DE | 197 23 974 A1 | 12/1998 |
| DE | 199 32 520 A1 | 7/1999 |
| DE | 199 37 963 A1 | 2/2001 |
| DE | 102 48 762 | 6/2005 |
| EP | 1 354 740 A1 | 10/2003 |

* cited by examiner

Pixel Value after
Difference Evaluation

Pixel Value after
Difference Evaluation

VEHICLE WITH MOVABLE CONVERTIBLE TOP

REFERENCE TO RELATED APPLICATION

This application is a U.S. national phase filing under 35 U.S.C. §371 of Patent Cooperation Treaty No. PCT/DE2003/003442, filed Oct. 17, 2003, which claims priority to German Patent Application No. 10248762.6, filed Oct. 18, 2002, the entire content of all of which are incorporated herein by reference.

FIELD OF THE INVENTION

The present invention concerns a motor vehicle with a movable convertible top, a device for the recognition of the convertible top position, and a detection device that is used to recognize an interference into the range of motion of a convertible top mechanism.

BACKGROUND OF THE INVENTION

Newer convertible vehicles are often equipped with a movable convertible top, which can be automatically moved for example from an open to a closed position or vice versa with the push of a button. The movement of the convertible top is usually effected by a hydraulic drive, which in turn drives a convertible top mechanism, which includes a convertible top linkage, wherein the convertible top linkage may be a carrying device for a textile roof as well as a so-called hard-top folding roof with mainly rigid roof elements, and comprises, where applicable, a cover for a convertible top compartment as well as all elements that are being moved in the process.

Since problems in the process of the convertible top motion such as a decelerated movement or jamming of the convertible top can be hints that an object or a person's body part might be caught in the convertible top linkage, and this type of obstruction situation requires an immediate reaction to avoid injury, it is common knowledge to provide a detection device to recognize an interference into the range of motion of the convertible top mechanism.

European Patent Application 0 943 473 A2 describes a motor vehicle with a convertible top that can be moved using a drive with a convertible top control, wherein sensors that are in particular designed as cameras are provided to recognize the position of the occupants in a vehicle interior. The sensors, which are attached above the occupants, monitor a safety area between the occupants and the convertible top in addition to the position of the occupants in their seats and are connected to a convertible top control. As soon as the convertible top control recognizes that the occupants do not stay out of a safety zone below the convertible top and therefore injuries to the occupants caused by the moving convertible top can not be ruled out, the convertible top drive is stopped.

The disadvantage of the sensors provided in EP 0 943 473 A2, which can be cameras, infrared sensors or ultrasonic sensors is that they are often prone to errors in regard to their signals and, in the event that optical sensors are used, that they can not monitor blind spots.

German Patent Application 197 23 974 A1 also describes a method to prevent foreign objects being caught in an opening that is to be closed using a power-operated device, which operates with an opto-electronics sensor system. When a foreign object is caught in an opening that is to be closed, the power-operated device is switched off or switched to reverse mode using a detector beam. The direction of the detector beam is continuously changed in the process, so that the detector beam moves over the area of the edge of the opening that is to be closed.

However, this type of obstruction sensor can only be implemented with significant effort for the movable convertible top of a convertible and does not offer any protection against injuries in the event of errors or system failure.

Practice has shown that a detection of obstructions is possible with adequate accuracy with the aid of a capacitive sensor device.

This type of obstruction sensor with a capacitive sensor system is described in German Patent Application DE 198 36 056 A1, wherein the device that is being used to detect the obstructions, in particular when automatically closing convertible tops, vehicle windows or the like includes a capacitive sensor device, which consists of an electroconductive transmitter surface on one side, and an electroconductive sensor wire and at least one metal surface that is mainly potential-free on the other side of an insulator. The transmitter surface and the sensor wire are connected to an electronic analysis circuit.

The disadvantage of these types of obstruction protection devices operating with a capacitive sensor system is the same as for those of other obstruction protection devices using pressure sensors that are known from practical applications: they react very late in the event of an obstruction situation, in the case of pressure sensors not until the object that interferes with the movement has made contact.

SUMMARY OF THE INVENTION

It is the object of the present invention to provide a motor vehicle with a power-operated convertible top, which permits the most reliable and earliest detection of an intervention into the range of motion of a convertible top mechanism possible, so that an automatic convertible top motion takes place without injuring a person's body parts or damaging components.

In accordance with the invention, this object is solved with a motor vehicle comprising a movable convertible top, control equipment for controlling convertible top motion and a detection device for recognition of an intervention into the range of motion of a convertible top mechanism. The detection device is equipped with a sensor system with sensors that carry out measurements based on different measurement principles. When recognizing a malfunction of the detection device or in the event of an obstruction situation, the convertible top motion is controlled in a safety mode, during which the convertible top motion continues with reduced speed and power or is stopped or reversed.

The advantage of the solution in accordance with the invention is that it ensures obstruction protection by using various sensor systems even if there is a failure of a sensor system that operates according to a certain measurement principle or if an obstruction situation is not detected or not detected in time. The transition into safety mode when the convertible top mechanism is driven, whereby the convertible top mechanism may be a convertible top linkage and a convertible top compartment cover, if provided, with the related movable elements, ensures a reaction that is geared towards the particular operating situation. The reaction can consist of continuing the convertible top movement with reduced speed or stopping or reversing the convertible top movement.

If some of the sensors make up an optical sensor system, it is possible to recognize an obstruction situation early on before the object that intervenes into the range of motion of the convertible top mechanism makes contact with the convertible top mechanism.

In doing so, it is advantageous that optical sensors can be used that might already exist and are used for example to recognize the occupant position to control safety systems such as an airbag. Thus, such devices that are described for instance in German Patent Applications DE 198 14 691 A1 and DE 199 32 520 A1 and that are used for the detection of the position of objects and/or persons in the interior of a motor vehicle can be used to carry out a further function.

In an advantageous embodiment, the optical sensor system may comprise an optical light emitting and receiving device, which creates at least one detection plane around the range of motion of the convertible top and detects an intervention into the detection plane with the aid of a reflection detection device.

The term "light" in the present sense is not only limited to the range of electromagnetic radiation emitted by a radiation source that is visible to the human eye, but includes also the range of optical radiation that is not visible to the human eye, which also includes infrared radiation, ultraviolet radiation, X-rays, and microwave radiation. In particular the use of microwave radiation represents an advantageous alternative to the use of visible light within the scope of the present invention.

As an alternative or as a supplement, another advantageous use of the invention is achieved when the optical sensor system is designed with image sensors. In doing so, the vehicle interior or passenger compartment can be sensed using at least one of these optical sensors directed to the passenger compartment, such as a camera or a photosensor according to the EP0943473 A2, whereby the range of motion and the movement of the convertible top are monitored in an electronic analysis unit based on the output signals supplied by the optical sensor.

Other sensors of the sensor system that operates according to a different measurement principle that can be used for instance are ultrasonic sensors, pressure sensors or capacitive sensors.

Part of the detection device's sensor system is preferably designed using capacitive sensors, which permit the contactless obstruction recognition due to a change of the dielectric.

In order to ensure that an obstruction situation is reliably recognized it is advantageous to provide several capacitive sensors, which are self-synchronizing in the event of a capacity change of all sensors, e.g., due to a change in air humidity. When only a selection of the capacitive sensors that are used are responding, the probability is high that an obstruction situation is present. The reliability of the output signal can be further increased by evaluating the dynamics of the capacitance change.

Capacitive sensors are appropriately located in critical areas of convertible top movement, such as in the area of elements that are connected with a hinge such as in the area of the convertible top linkage and/or a tensioning bow and/or a convertible top compartment cover and/or a windshield frame and/or an area next to a window.

As a matter of principle, the capacitive sensor system can be made up of suitable capacitive sensors—e.g., the sensors quoted in the beginning—that are known for the particular application. However, due to the size of the known capacitive sensors the positioning options for the sensors are often limited.

The invention also involves a capacitive sensor, which is particularly suitable to detect an obstruction situation during convertible top motion. The electrodes of this capacitive sensor are located on a film material that can be deformed in all directions. The dielectric is created by the air in this case.

This kind of sensor foil that only requires a minimum of installation space can be attached in all areas of a mobile convertible top, whereby it is most advantageous to attach it between a sealing section and/or a trim part and its support.

Another advantageous option for recognizing an obstruction situation is the evaluation of a convertible top drive's power consumption.

In an advantageous embodiment of the invention the sensor system may include at least one sensor that is used to measure the power consumption of a convertible top drive, which is connected to an electronic analysis unit, by means of which an obstruction situation is detectable by comparing the present current flow with mathematically calculated obstruction situation criteria in regard to the current flow.

The accuracy of information on the current convertible top position is of major importance in order to ensure reliable obstruction protection. In principle, known potentiometers can be used to continuously sense the travel of the convertible top, which are attached to a pivot point of a roof part for which the position is to be detected.

It is also possible to recognize the convertible top position by measuring the retraction travel of the cylinders of a convertible top drive's hydraulic system; however, it has to be observed in this case that this type of solution requires a larger installation space and does not provide information on the actual position of the convertible top, but only on the cylinder's distance of travel. Therefore, a possibly defective connection point, that is, a disruption of the connection between a cylinder and the convertible top linkage cannot be detected.

Thus, in a preferred embodiment of the invention a continuous convertible top position recognition device is provided that monitors the position of the convertible top; the device uses an acceleration sensor, which measures the actual acceleration in relationship to the acceleration of free fall, to calculate the position of a defined element of the convertible top mechanism.

With the aid of these types of acceleration sensors, which are also called G-sensors and which sense two axes in one plane, the longitudinal acceleration and the lateral acceleration, it is possible to determine the longitudinal inclination and the transversal inclination of the convertible top. The angle to the surface of the earth can be resolved to approx. 0.2° with the aid of a very high possible resolution of the acceleration.

As a result, the use of the G-sensor makes it possible to accurately recognize the convertible top position at any time and also offers high freedom in the design of their disposition, since this type of convertible top position recognition can be implemented independently from convertible top kinematics.

Furthermore, these types of acceleration sensors offer the advantage that they can also be used for other functionalities in the vehicle, such as for roll-over detection.

Additional advantages and advantageous features of the invention will be readily understood after reading the description, the drawings, and the patent claims.

The drawings show schematically examples of the invention, which will be explained in further detail in the following description.

DETAILED DESCRIPTION OF THE INVENTION

Figure 1:
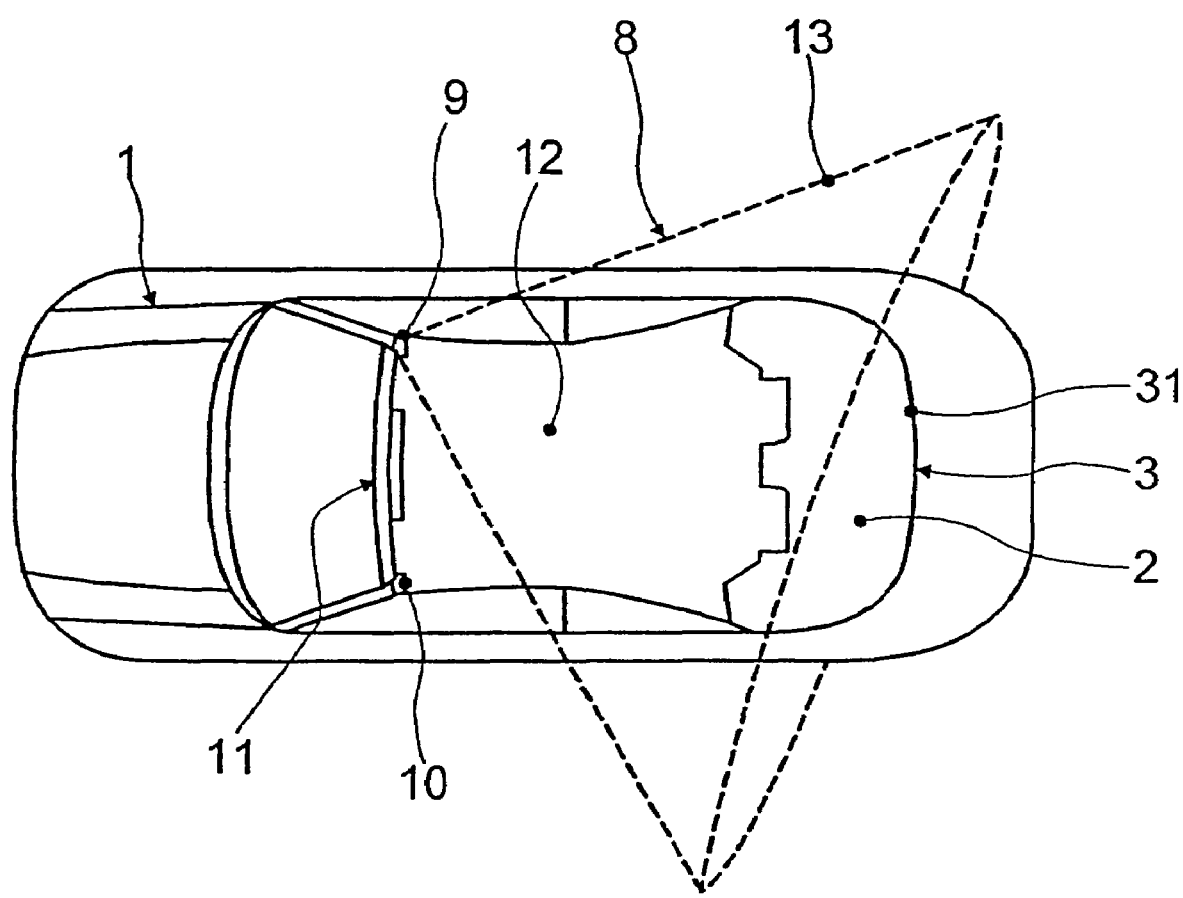
FIG. 1 is a schematic top view of a convertible with an open movable convertible top, in which image sensors of a detection device according to the invention are shown.
Figure 2:
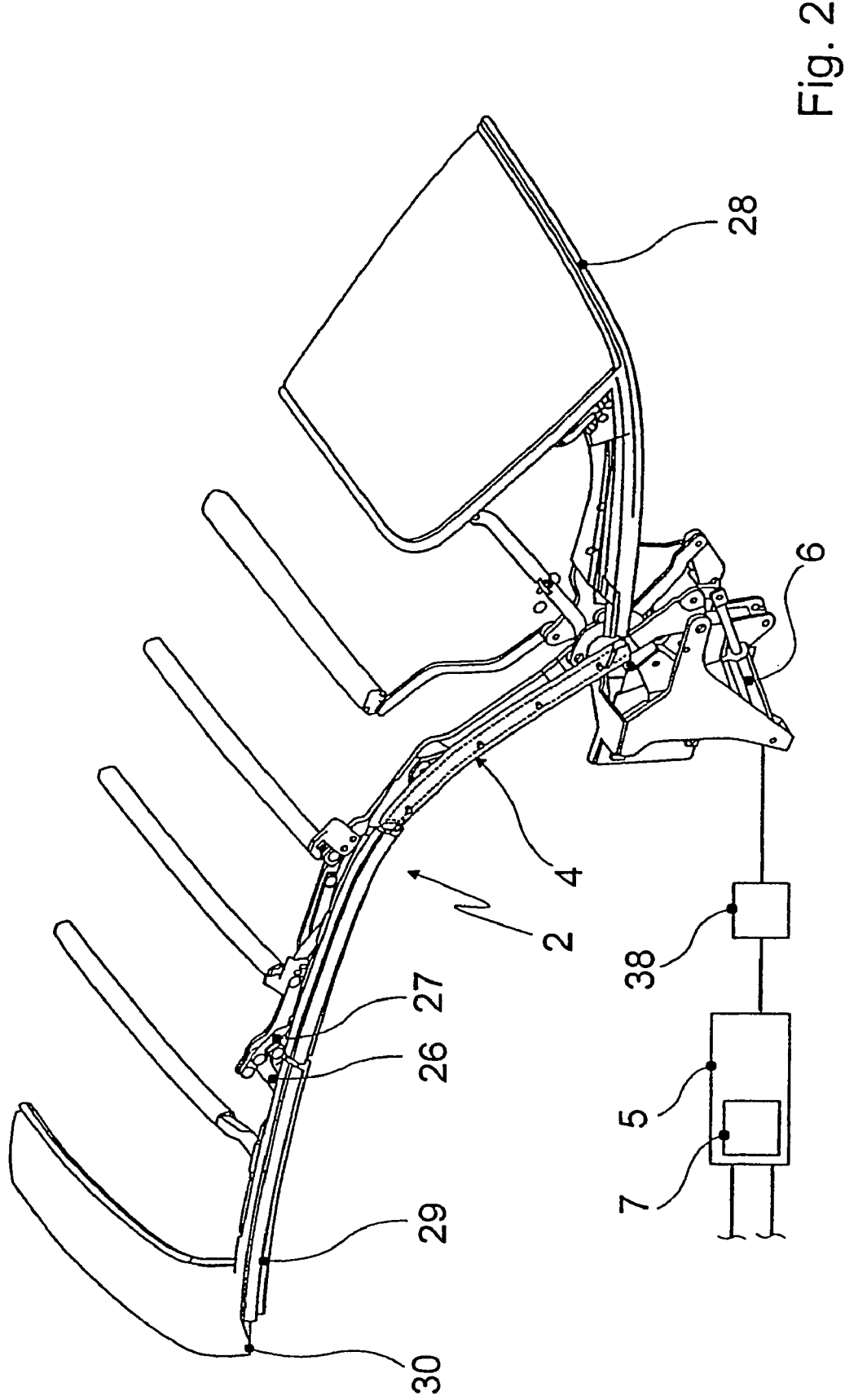
FIG. 2 shows the convertible top only of the motor vehicle according to FIG. 1.

FIG. 1 shows a convertible vehicle 1 with a movable convertible top 2, which is shown in greater detail in FIG. 1 in open condition and folded into a convertible top compartment 3, and which is shown individually in FIG. 2.

The convertible top 2 comprises a convertible top mechanism 4, which can be moved between an open and a closed position using control equipment 5 that represents a convertible top control unit and electro-hydraulic convertible top drive 6, of which only sections are shown in FIG. 2.

The control equipment 5 is designed so as to interact with a rain sensor and a key transmitter, and to start an automatic convertible top motion upon the request of the driver with the aid of a button in the vehicle or through the key transmitter, as well as when precipitation is recognized by the rain sensor.

To be able to reliably carry out the automatic convertible top movement without the intervention of the vehicle user and without the user's supervision, an automatic detection device 7 is provided for the detection of an interference into the range of motion of the convertible top mechanism 4, which is here integrated into the convertible top control unit 5 in terms of the electronic analysis unit.

The detection device 7 comprises a sensor system with sensors that operate according to different measurement principles, whereby part of the sensor system represents an optical sensor system 8, which is shown schematically in FIG. 1, and which is fitted with two image sensors 9, 10 in the version according to FIG. 1.

In the shown embodiment, the image sensors 9, 10 are each located on windshield frame 11 in the transition area to an A-pillar; however, an alternative version is also possible, in which only one image sensor is located in the center or where the image sensors are attached to the outside mirrors or other suitable elements on the periphery of the motor vehicle.

In the present example, image sensors 9, 10 represent black and white cameras, which record a vehicle interior 12 and a swivel range at the rear of the convertible top 2, as shown with a viewing zone in FIG. 1 for camera 9 which is positioned on the right of a vehicle in the forward driving direction.

The images recorded by cameras 9, 10 are evaluated using suitable analysis algorithms of detection device 7. In the process, in the illustrated version the difference is determined for example between two consecutive images, whereby the resulting image is used to calculate the sum of the remaining pixels. An intervention into the range of motion of the convertible top mechanism 4 is indicated by a sudden increase above and beyond a defined limit value in a run of the number of pixels over time.

In order to obtain greater independence from environmental influences it is appropriate to subtract the difference images of both cameras 9, 10 from one another. When cameras 9, 10 are appropriately aligned, the result is a difference in the dynamics of the image change between the right and the left side of the motor vehicle 1.

Figure 3A:
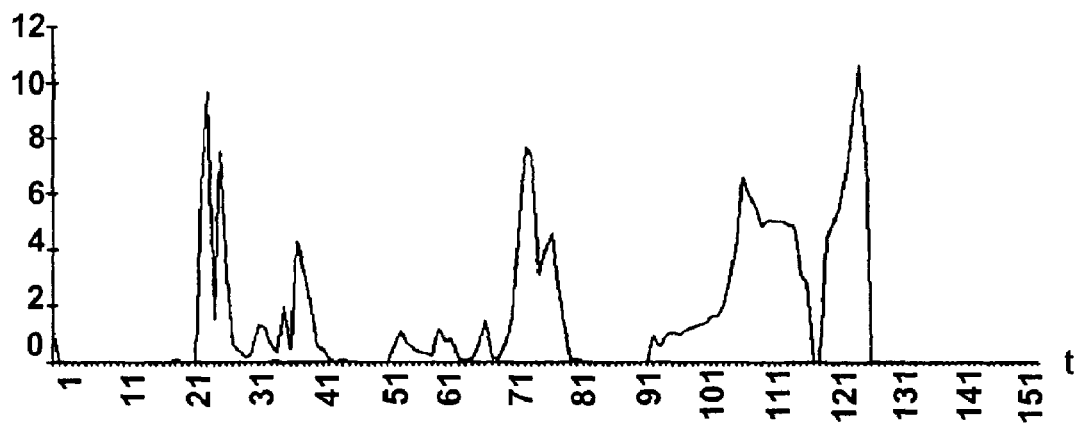
FIGS. 3a and 3b show courses of pixel values after calculating the difference during image evaluation.
Figure 3B:
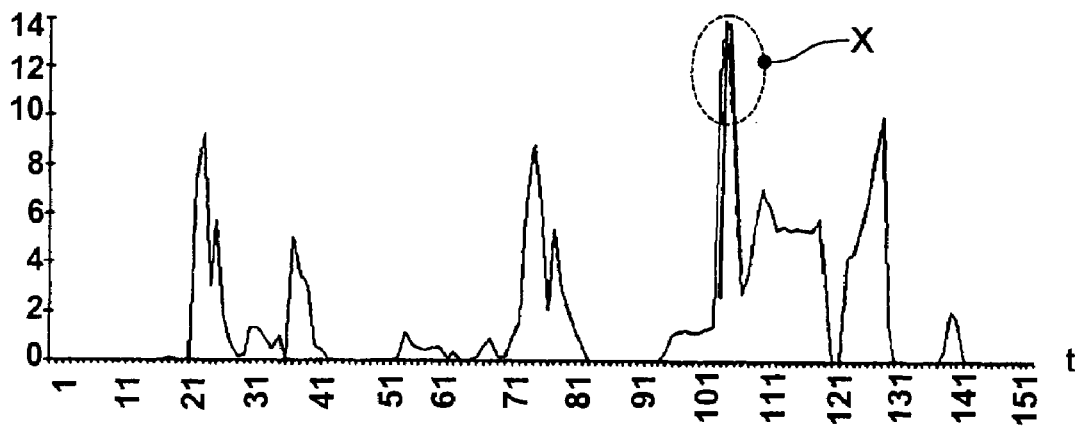

FIGS. 3a and 3b show the course of pixel values after calculating the difference during time t. FIG. 3a shows a pixel value course for an undisturbed convertible top motion, and FIG. 3b shows a pixel value course for a convertible top movement with an intervention into the convertible top mechanism 4. In the shown example, the area marked with "X" in FIG. 3b shows a clear increase in the number of pixels over time, which represents the intervention into the convertible top mechanism 4.

An image cluster method is also suitable to analyze the images, whereby the range of motion of the convertible top mechanism 4 is subdivided into selected image sections and the relative changes are evaluated in each image section.

In the event of a fault, which is detected by evaluating the image information in critical areas that are defined in the software of the detection device 7, a previously defined reaction takes place whenever a fault is detected, which can consist of interrupting the convertible top motion, reversing a partial motion or automatically moving back to the start position.

Figure 4:
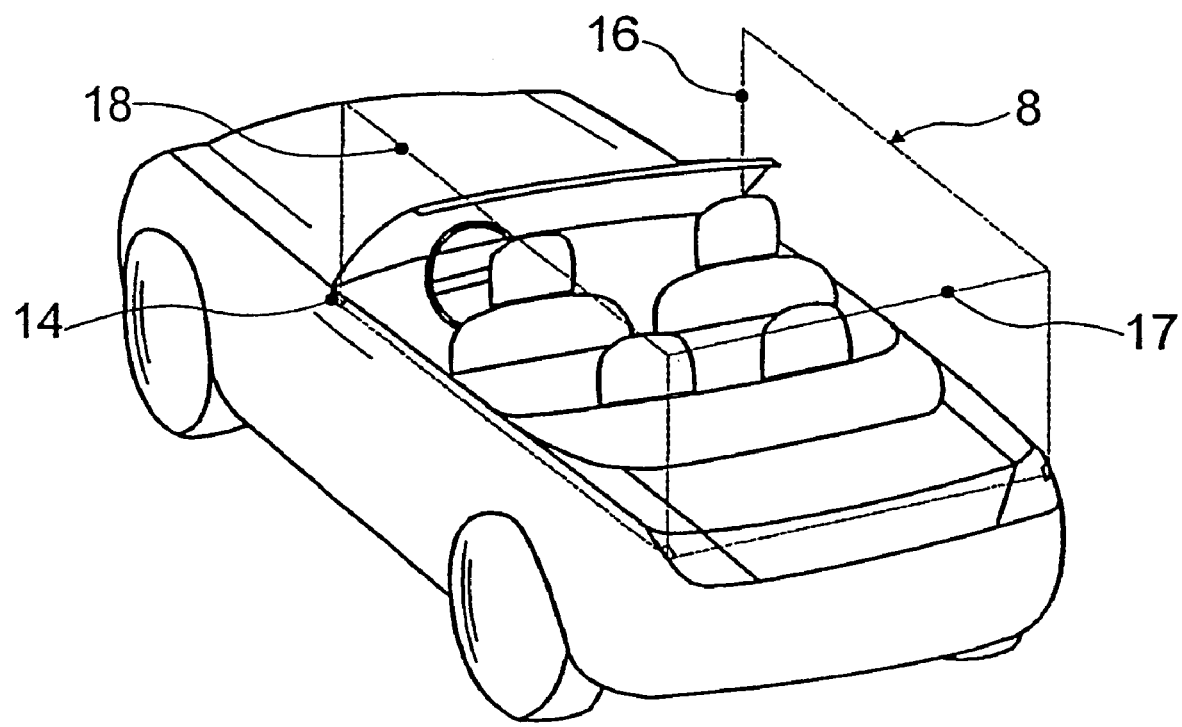
FIG. 4 is a schematic three-dimensional view of the motor vehicle according to FIG. 1, in which an optical sensor system of the detection device according to the invention is shown that creates detection planes.
Figure 5:
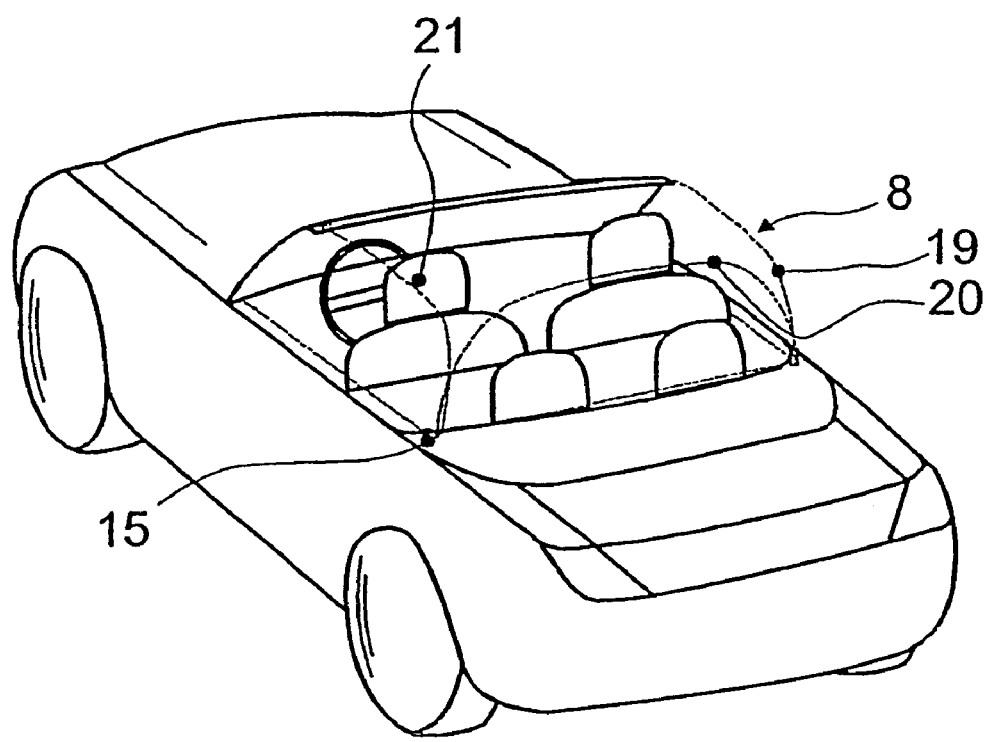
FIG. 5 shows the motor vehicle according to FIG. 3 with another sensor system that creates a further detection plane.

FIGS. 4 and 5 show a further embodiment of a sensor system 8 with an optical light emitting and receiving device 14 or 15, which, in the case of FIG. 4, creates light planes 16, 17, 18 around the range of motion of the convertible top 2 on the side of the convertible top mechanism 4 facing the outside of the vehicle, and in the case of FIG. 5, creates light planes 19, 20, 21 around the range of motion of the convertible top 2 on the side of the convertible top mechanism 4 facing a passenger compartment 12.

The light emitting and receiving devices 14 or 15 can be designed in the familiar way with a laser as the light source as is known for instance from German Patent Application DE 37 00 009 A1.

When the light planes 16 to 21 are penetrated by an object or a human body part, a reflection deviation occurs, which is measured by suitable reflection detection devices such as a sensor and transmitted as a signal to an evaluation unit of the detection device 7. The electronic analysis unit uses these output signals to calculate a distance and an angle of intervention into the particular light plane with the aid of suitable algorithms.

The presented capacitive sensor system 8 permits contactless obstruction recognition and is therefore particularly suited as part of a multisensor system, such as the sensor system of the detection device 7, which also comprises a capacitive sensor system 49 in addition to the optical sensor system 8 in the shown embodiment.

Figure 6:
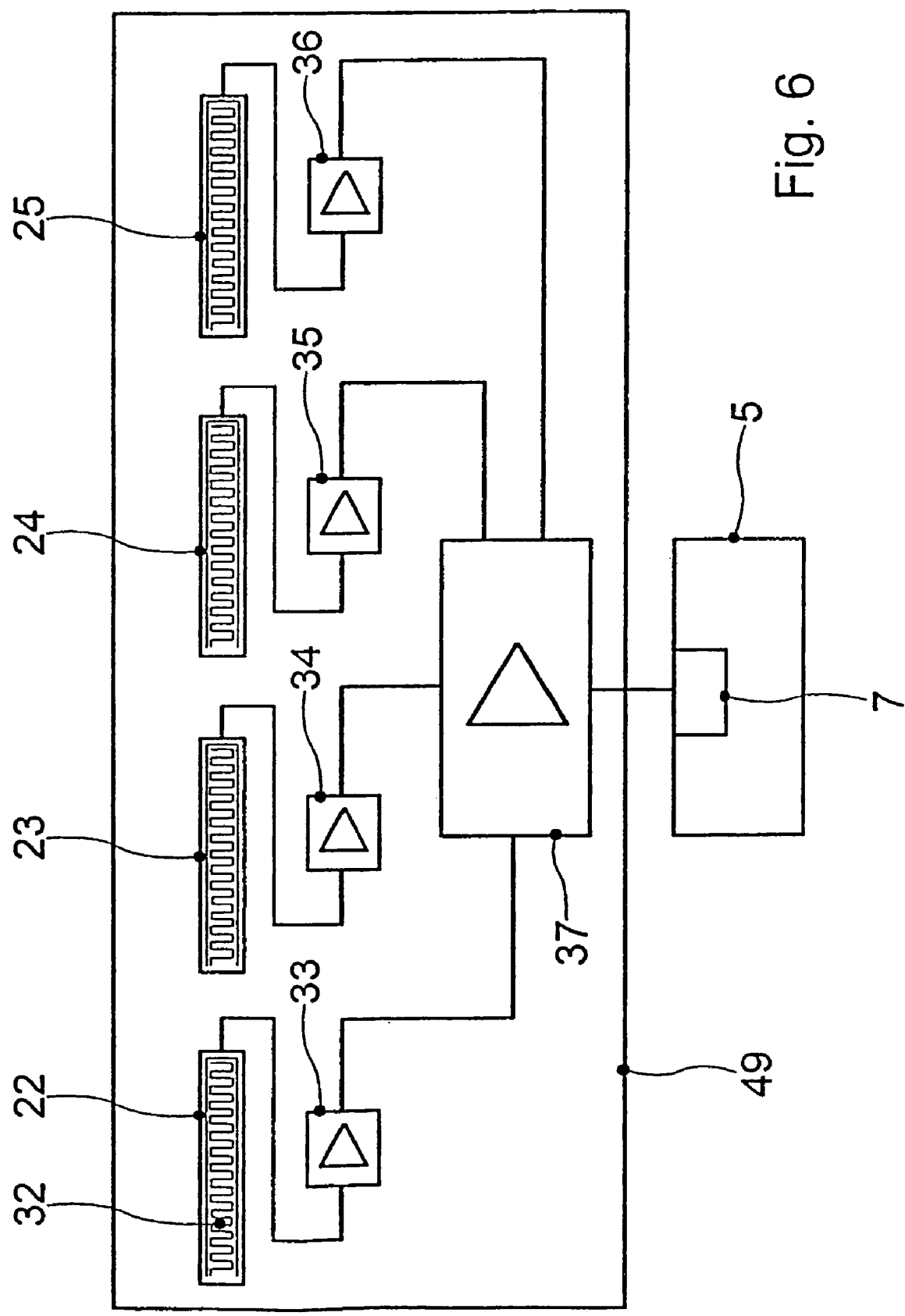
FIG. 6 is a schematic figure of a setup for a capacitive sensor system of a detection device according to the invention.

FIG. 6 shows in principle a possible design of the capacitive sensor system 49, which has several capacitive sensors, a selection of which are shown with the capacitive sensors 22, 23, 24, and 25 in FIG. 6.

In the shown version, the capacitive sensors 22 to 25 are each located in a critical area of the convertible top mechanism 4, such as in an area of elements 26, 27 which are connected with each other by hinges-like connections as shown in FIG. 2, and which are elements of a convertible top linkage, a tensioning bow 28, an area 29 next to a window, an area 30 abutting to the windshield frame 11, and in an abutting area for a convertible top compartment cover 31 indicated in FIG. 1.

As shown schematically in FIG. 6, each of the present capacitive sensors 22 to 25 is designed as a flat, film-like sensor, on which electrodes 32 are located on a film material. The special structure of the conductor tracks on this film results in a capacitive sensor, which on one side of the film reacts upon a dielectric change, which is air for the capacitive sensors 22 to 25. Thus, capacitance changes when an object or a body part approaches, which is converted into analog voltage signals in an integrated electronic circuit for further processing in the control equipment 5 of the convertible top 2.

As appears from FIG. 6, the film-like sensors 22 to 25 are each connected to the convertible top control unit 5 via electronic analysis technology or via electronic analysis circuits 33, 34, 35, 36, which generate an analog voltage signal using the capacitance of the sensor, whereby a readjusting threshold switch 37 is provided between the electronic analysis circuits 33 to 36 and the convertible top control unit 5 in the depicted version. The re-adjustable threshold switch 37 for instance causes, in the event of a sharp increase of air humidity in the environment, such as in the event of contact with snow, an offset (change) of the switch point and thus an associated reduction of the sensitivity of all sensors, so that a body part such as a finger can be detected right through the snow. The electronic analysis circuits 33 to 36 allocated to the individual sensors 22 to 25 are also arranged on the film material.

The capacitive sensor films 22 to 25, which are mounted between sealings or trim parts of the convertible top mechanism 4 and their support to the extent possible, are able to detect a foreign object at a distance of up to 60 mm for example.

To rule out that the system is being triggered erroneously due to external influences, the used sensors 22 to 25 are synchronized, and the plausibility of their signals is checked by the appropriate electronic analysis device or threshold switch 23. In the event of a capacitance change of all capacitive sensors the system assumes that the environmental influences have changed, whereby an obstruction situation is detected when the capacitance changes in only a selection of the capacitive sensors, e.g., one or two adjacent sensors.

As appears from FIG. 2, the sensor system of the detection device 7 comprises an additional sensor 38 for the recognition of the power consumption of the convertible top drive 6, which is connected to a corresponding electronic analysis unit of the detection device 7 or the convertible top control unit 5 respectively, which checks whether an obstruction situation is present by comparing the present current flow with mathematically calculated obstruction criteria in regard to the current flow.

Figure 7A:
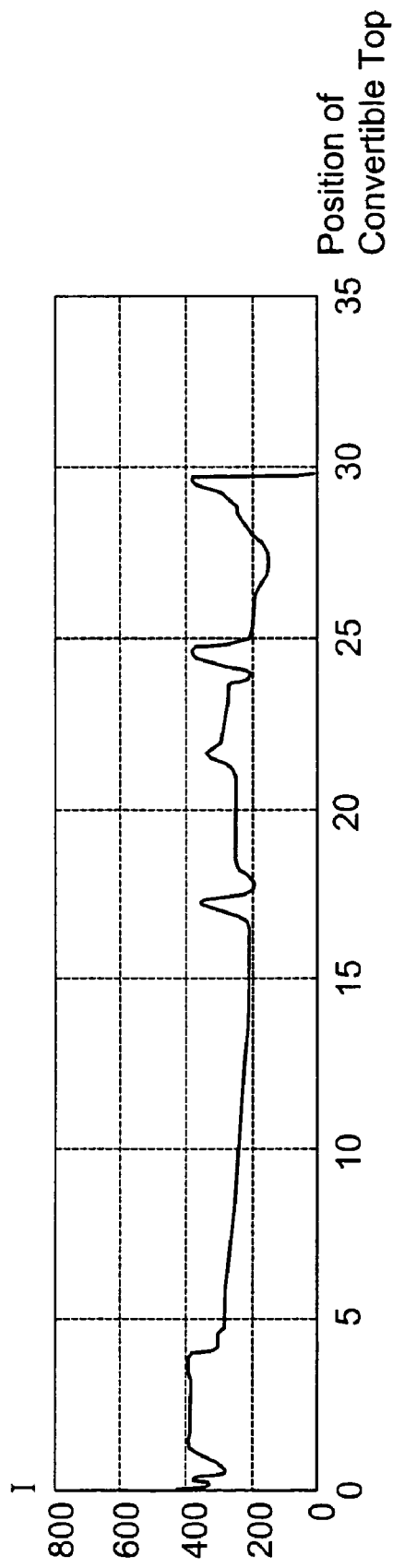
FIGS. 7a and 7b show current flows for the evaluation of signals of a sensor that is used to measure the power consumption of a convertible top drive with the detection device in accordance with the invention.
Figure 7B:
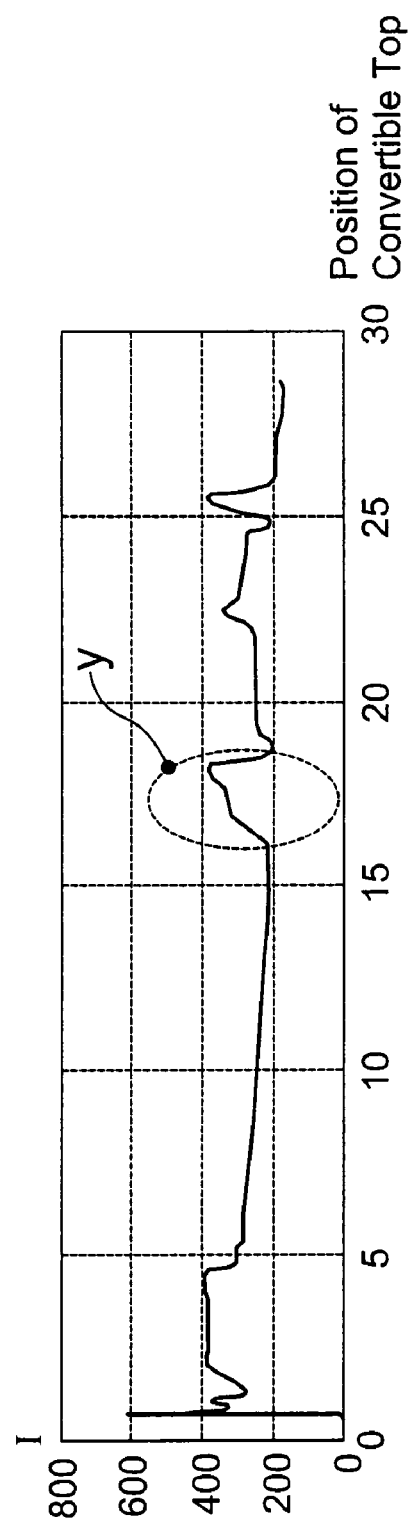

FIGS. 7a and 7b show the differences in the current flows, whereby FIG. 7a shows a characteristic run of current I for a certain convertible top position that is present whereby there is no intervention into the range of motion of the convertible top mechanism 4. When comparing the present current flow shown in FIG. 7b to the characteristic current flow of FIG. 7a, a deviation becomes apparent in an area marked with "Y", which represents the characteristic change of current I. This characteristic change of current I in area Y is interpreted by the electronic analysis unit as an intervention into the range of motion of the convertible top mechanism 4, since an increase of power consumption of the convertible top drive which is embodied here with a hydraulic pump, is due to a power input into the convertible top mechanism 4 opposite to the direction of motion.

The system assumes that an obstruction situation is present after comparing the characteristic obstruction situation criteria that are stored in the electronic analysis unit and detecting that these criteria apply to the present current flow. Outer boundary conditions such as temperature and battery voltage can be eliminated for the most part with the aid of appropriate algorithms when monitoring the current.

Although legal requirements on the maximum permissible clamping force of e.g., a maximum of 100 N can already be met during this type of current evaluation alone, it is necessary to make contact with the object interfering with the movement. Thus, in the depicted version the current is evaluated using the sensor 38 in combination with a sensor operating based on another effective technical principle for the plausibility check or as an additional protection in areas of the convertible top mechanism 4 that are not checked.

Figure 8:
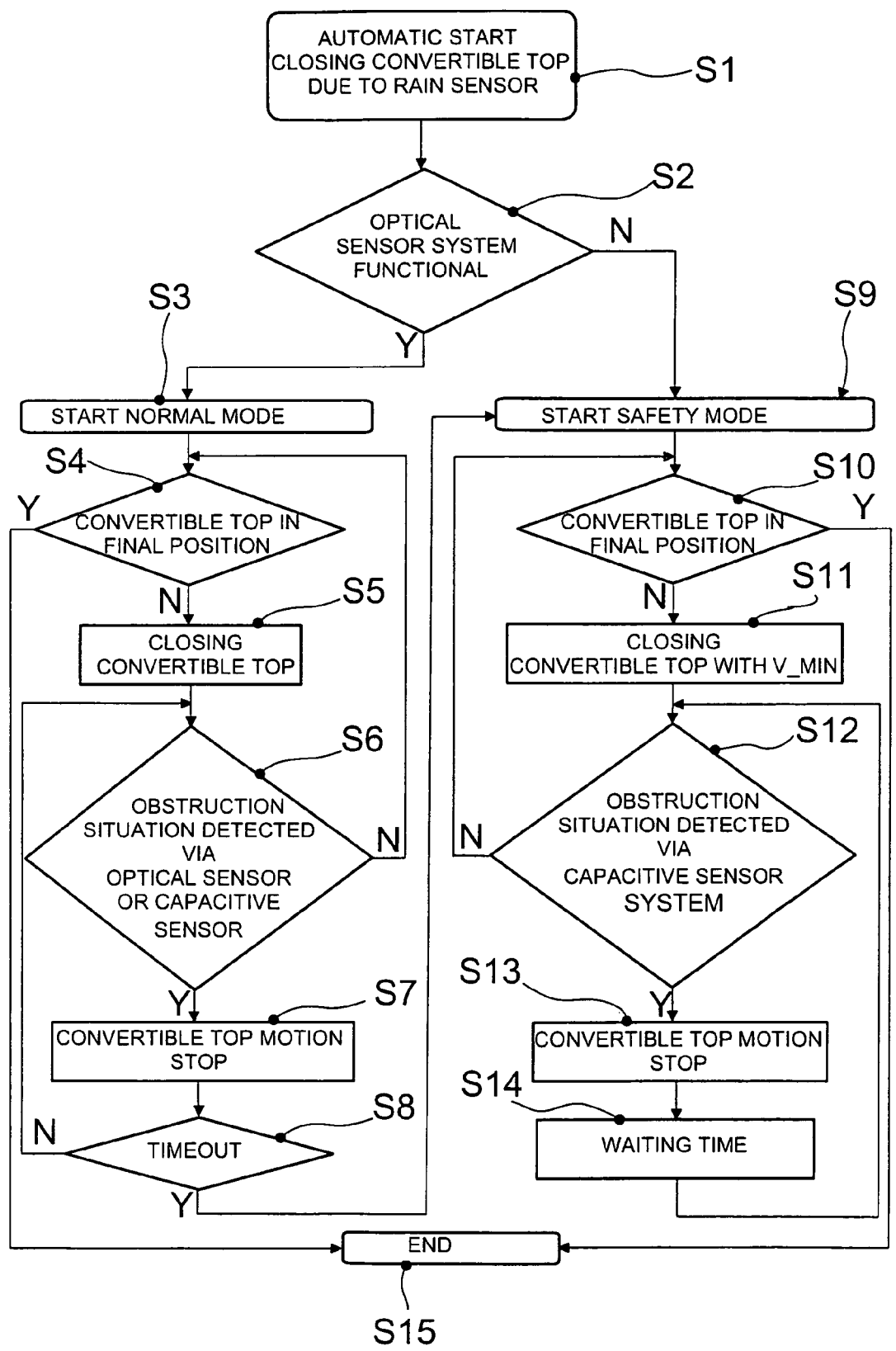
FIG. 8 shows a flow chart showing the control of the convertible top motion in normal mode and safety mode.

As soon as a fault is detected in the detection device 7 or the previously described sensor system detects an obstruction situation during the convertible top motion, the convertible top motion is controlled in safety mode shown in further detail in FIG. 8, in which the convertible top motion continues with reduced speed and power, is stopped, or reversed in part or completely.

As appears from the flow chart in FIG. 8, an automatic start of the convertible top motion is triggered in order to close the convertible top in a first step S1, when a defined amount of water is detected by a rain sensor.

After the start of the automatic convertible top motion, it is checked in a second step S2, whether the present optical sensor system 8 is functional. If the system is functional, a processing function S3 defined for normal mode is started, in which the convertible top mechanism 4 is driven with maximum power and speed.

In the process, an inquiry function S4 constantly checks, whether the convertible top 2 has already reached the final position. If this is the case, the system proceeds with a processing function S15 that ends the monitoring function; otherwise the convertible top 2 is kept in closing motion with the aid of a further processing function S5, whereby the system permanently uses an inquiry function S6 to check during the motion, whether an obstruction is detected by the optical or the capacitive or another sensor system.

In the event of a positive inquiry result of inquiry function S6, in other words when an obstruction situation is detected, the convertible top motion is stopped at first by means of a subsequent processing function S7, and a waiting time is started. An inquiry function S8, which is also called a "Timeout" function, is used to check while the convertible top motion is stopped, whether the obstruction situation is still present.

If the obstruction situation no longer applies, the system returns to inquiry function S4 in order to check, whether the final position of convertible top 2 has been reached; otherwise a continued convertible top motion is permitted via function S5.

If the check result of inquiry function S8 is that the obstruction situation is still present after the waiting time has ended while the convertible top motion is stopped, the system is started in safety mode by a processing function S9. This safety mode is also started if inquiry function S2 detects that optical sensor system 8 is not functional immediately after the automatic convertible top motion starts.

After starting in safety mode, an inquiry function S10 checks, as in normal mode, whether convertible top 2 has reached its final position. If this is already the case, the system proceeds with function S15 which ends the monitoring function.

Otherwise, the convertible top motion continues via a processing function S11 with reduced speed v_min, whereby an inquiry function S12 is used to check during this decelerated convertible top motion, whether an obstruction situation is detected via the capacitive sensor system or via current evaluation. If this is not the case, the system returns to inquiry function S10, and the convertible top is closed with reduced speed until it has reached its final position.

If an obstruction situation is detected by inquiry function S12 in safety mode, the convertible top motion is stopped or reversed by a processing function S13 depending on the severity of the obstruction situation, whereby a waiting time is started in a further step S14, during which the system checks whether the obstruction situation is still present. As long as this is the case, the convertible top motion remains stopped or reversed.

With the aid of the safety mode it can be ruled out that the automatic function of the convertible top motion is not started due to a single error and that the vehicle is possibly damaged as a result. On the other hand, an adequate reaction is triggered immediately in the event of a clear obstruction situation.

Figure 9:
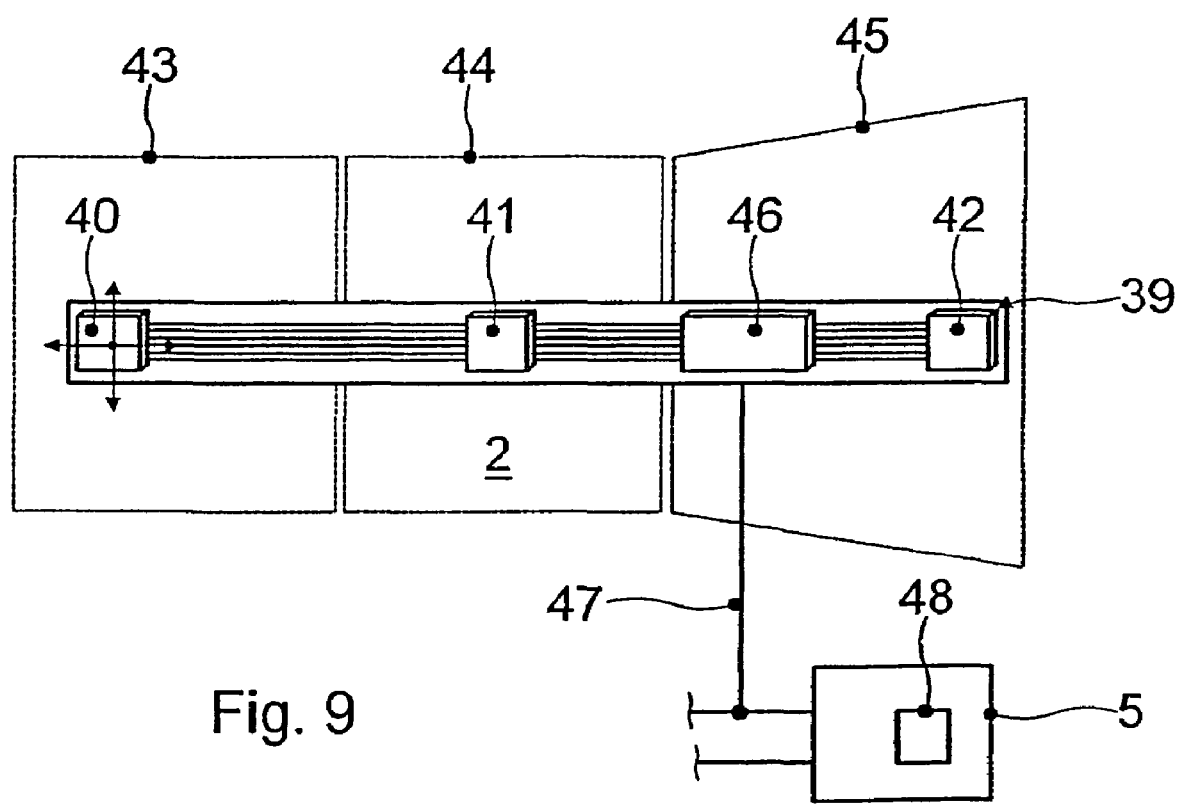
FIG. 9 is a diagrammatic figure of a convertible top position recognition device.

A continuous convertible top position recognition 39, which is shown in principle in FIG. 9, is provided to ensure the most reliable evaluation of the present signals possible.

The convertible top position recognition 39 is formed of several acceleration sensors 40, 41, 42, each of which are located on a certain roof element, e.g., the acceleration sensor 40 on a front roof segment 43, the acceleration sensor 41 on a center roof segment 44, and the acceleration sensor 42 on a rear roof segment 45. The acceleration sensors 40, 41, 42 represent so-called G-sensors, which measure and indicate the current acceleration relative to the acceleration of fall or normal g force. The earth's acceleration of free fall of 9.81 m/s$^2$ corresponds to 1 G (G=gravitation). The acceleration sensors 40, 41, 42 not only measure the acceleration of the element onto which each of them is attached, but also the incline in relationship to the earth's surface.

The acceleration sensors 40, 41, 42 that are used here operate in a range of 0 G up to a maximum of 10 G and provide an output voltage, which is linear to the acceleration value.

The acceleration sensors can be positioned anywhere on the convertible top 2, whereby attention is to pay only to the orientation in a defined co-ordinate system.

As appears from FIG. 9, the acceleration sensors 40, 41, 42 on the convertible top 2 are connected via a suitable wiring harness or a highly-flexible microstrip to an electronic analysis unit 46, which analyzes the sensor signals and calculates a relative position using the individual positions. The calculated relative position of the acceleration sensors 40, 41, 42 or the components that carry them is transmitted to the convertible top control unit 5 by the electronic analysis unit 46 via a bus system such as a CAN bus 47.

In the embodiment described here, a further acceleration sensor 48 that is designed as a G-sensor is located in the convertible top control unit 5; the sensor determines the location or incline of the motor vehicle 1 in the defined co-ordinate system, to which the acceleration sensors 40, 41, 42 are allocated as well. The convertible top control unit 5 uses the relative position and the present information on the vehicle incline to calculate the current position of the convertible top 2.

Advantageously, the typical convertible top final position switches are no longer required when the convertible top position recognition 39 is used, since a corresponding pulse is put out by the acceleration sensors 40, 41, 42, when the convertible top 2 has reached a limit stop, in other words when it is fully closed or open; whereby, the sensors are subject to powerful negative acceleration.

Moreover, with the continuous convertible top position recognition 39 it is possible to implement an adaptive self-learning control of the convertible top motion, which may be realized for instance by manually driving to individual defined convertible top positions one time.

In doing so, the convertible top position can be determined with higher accuracy, which in turn improves the recognition of an obstruction situation during convertible top movement.

The invention claimed is:

1. A motor vehicle with a movable convertible top, comprising:
   control equipment for controlling movement of the convertible top; and
   a detection device for recognizing an intervention into the range of motion of the convertible top, the detection device including a sensor system having a plurality of sensors operating according to different measurement principles;
   the control equipment being operable, when a problem is recognized with the detection device or in the event of an intervention situation, to control the convertible top in a safety mode selected from the group consisting of continuing to move the convertible top with reduced speed and power, stopping movement of the convertible top, and reversing movement of the convertible top, the particular safety mode being selected dependent on the particular operating situation and the detected intervention situation.

2. A motor vehicle according to claim 1, wherein the sensors include an optical sensor system.

3. A motor vehicle according to claim 2, wherein the optical sensor system includes an optical light emitting and receiving device, which forms at least one light plane around the range of motion of the convertible top and detects an intervention into the light plane with the aid of a reflection detection medium.

4. A motor vehicle according to claim 3, wherein a laser is used as the light source of the tight emitting and receiving device.

5. A motor vehicle according to claim 3, further comprising an electronic analysis unit, which uses output signals of the reflection detection medium to calculate the distance and/or the angle of an intervention into the light plane.

6. A motor vehicle according to claim 3, wherein at least one light plane is formed on a side of the convertible top mechanism facing a passenger compartment.

7. A motor vehicle according to claim 3, wherein at least one light plane is formed on a side of the convertible top mechanism facing the outside of the vehicle.

8. A motor vehicle according to claim 2, wherein the optical sensor system includes at least one image sensor, which monitors the range of motion of the convertible top mechanism.

9. A motor vehicle according to claim 8, further comprising an electronic analysis unit that detects an intervention into the range of motion of the convertible top mechanism by difference image analysis.

10. A motor vehicle according to claim 8, wherein at least one image sensor is also allocated to a device that monitors the vehicle interior and/or the position of occupants.

11. A motor vehicle according to claim 1, wherein the sensor system includes at least one capacitive sensor.

12. A motor vehicle according to claim 11, wherein the sensor system includes multiple capacitive sensors and an intervention situation is detected when a selection of several of the multiple capacitive sensors is responding.

13. A motor vehicle according to claim 11, wherein at least one capacitive sensor that is used to recognize an intervention situation is located in the area of elements that are connected with hinges of a convertible top linkage and/or a tensioning bow and/or a convertible top compartment cover and/or a windshield frame and/or an area next to a window.

14. A motor vehicle according to claim 11, wherein the capacitive sensor that is used to recognize an intervention situation is located between a sealing section and/or a trim part and its support.

15. A motor vehicle according to claim 11, wherein the capacitive sensor comprises a film with electrodes located on foil material.

16. A motor vehicle according to claim 15, wherein air is the dielectric of the capacitive sensor.

17. A motor vehicle according to claim 11, wherein the capacitive sensor is connected to an automatically readjusting threshold switch.

18. A motor vehicle according to claim 1, wherein the sensor system includes at least one sensor for detecting the power consumption of a top drive, which is connected to an electronic analysis unit, by means of which an intervention situation can be detected by comparing the present current flow to a characteristic change in the current flow or by using mathematically calculated intervention criteria.

19. A motor vehicle according to claim 2, wherein a safety mode is started when a fault is recognized in the optical sensor system.

20. A motor vehicle according to claim 1, wherein in a normal mode the function of the sensor system is checked, and if the sensor system is found to be functional, a waiting time is started when an intervention situation has been recognized and the soft top motion is stopped and/or reversed; and wherein the system checks during the waiting time whether the intervention situation is still present, and wherein a safety mode is started if the intervention situation is still present.

21. A motor vehicle according to claim 1, wherein a processing function is started in a safety mode for closing or opening the convertible top with reduced speed, during which the system uses an inquiry function of an electronic analysis unit to check whether an intervention situation is present, wherein a processing function that stops and/or reverses the convertible top motion is started if the result of the inquiry is positive.

22. A motor vehicle according to claim 1, wherein the reaction whether to continue the convertible top movement with reduced speed or to stop or reverse the convertible top motion takes place in relationship to the intervention obstruction that is being recognized.

23. A motor vehicle according to claim 1, wherein after an automatic start of the convertible top movement an inquiry function is started for a fault in the detecting device or for detecting an intervention situation.

24. A motor vehicle according to claim 1, wherein a continuous convertible top position recognition is provided to monitor the position of the convertible top, which determines the position of a defined element of the convertible top mechanism using an acceleration sensor, which measures an actual acceleration in relationship to the acceleration of free fall.

25. A motor vehicle according to claim 24, wherein several acceleration sensors are located on elements of the convertible top mechanism and connected to an electronic analysis unit, which uses the signals of the acceleration sensors to calculate a relative position, which, together with the present information on the vehicle incline, results in the present convertible top position.

26. A motor vehicle according to claim 1, wherein the control equipment for the control of the convertible top motion is equipped with a further acceleration sensor that is used to detect the vehicle's inclination.

27. A motor vehicle according to claim 1, wherein the sensor system includes a rain sensor.

* * * * *